United States Patent [19]
Spriggs

[11] 3,733,665
[45] May 22, 1973

[54] ROTARY CUTTING TOOL

[75] Inventor: Frank A. Spriggs, Willoughby, Ohio

[73] Assignee: Pneumo Dynamics Corporation, Cleveland, Ohio

[22] Filed: Feb. 22, 1971

[21] Appl. No.: 117,418

[52] U.S. Cl. .............................. 29/105 R, 29/105 A
[51] Int. Cl. ................................................. B26d 1/12
[58] Field of Search ...................... 29/105 R, 105 A, 29/103 R

[56] References Cited

UNITED STATES PATENTS

| 3,213,716 | 10/1965 | Getts | 29/105 A |
| 2,751,663 | 6/1956 | Leuzinger | 29/105 A |
| 2,945,288 | 7/1960 | Berry | 29/105 R |

FOREIGN PATENTS OR APPLICATIONS 386,505    12/1923    Germany ........................... 29/105 R Primary Examiner—Leonidas Vlachos
Attorney—Stephen M. Mihaly

[57] ABSTRACT

Rotary cutting tool has plural circumferentially spaced milled arcuate slots in the end face of the cutter body providing arcuate seats for circular blade inserts which are releasably clamped in the slots. The slots are of sufficient depth to provide adequate support for the blade inserts during the cutting operation, and the slots also provide a preset dimension for the blade inserts as determined by the depth of the slots thus permitting turning of the blade inserts within the slots to present a new cutting edge or replacement of the blade inserts without affecting the cutting diameter of the tool.

8 Claims, 4 Drawing Figures

PATENTED MAY 22 1973
3,733,665
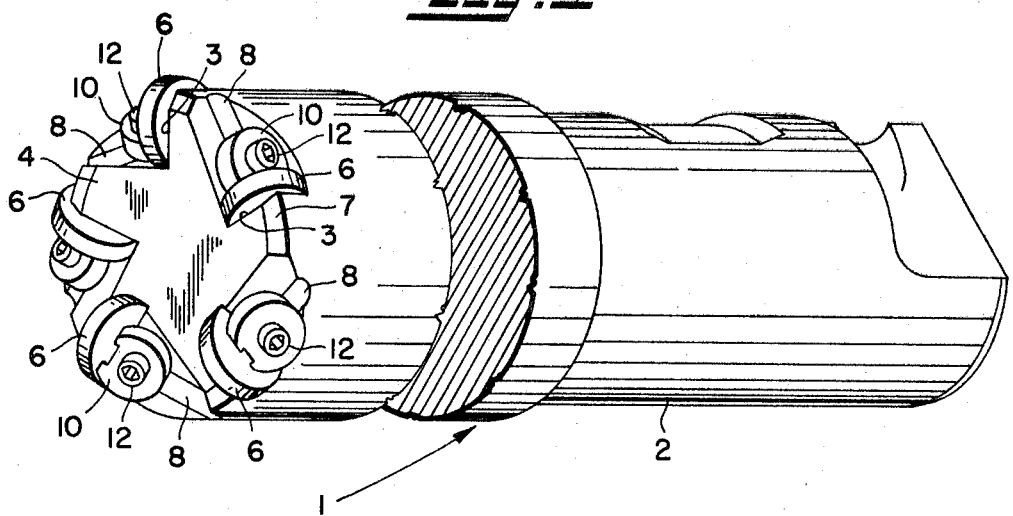
Fig. 1
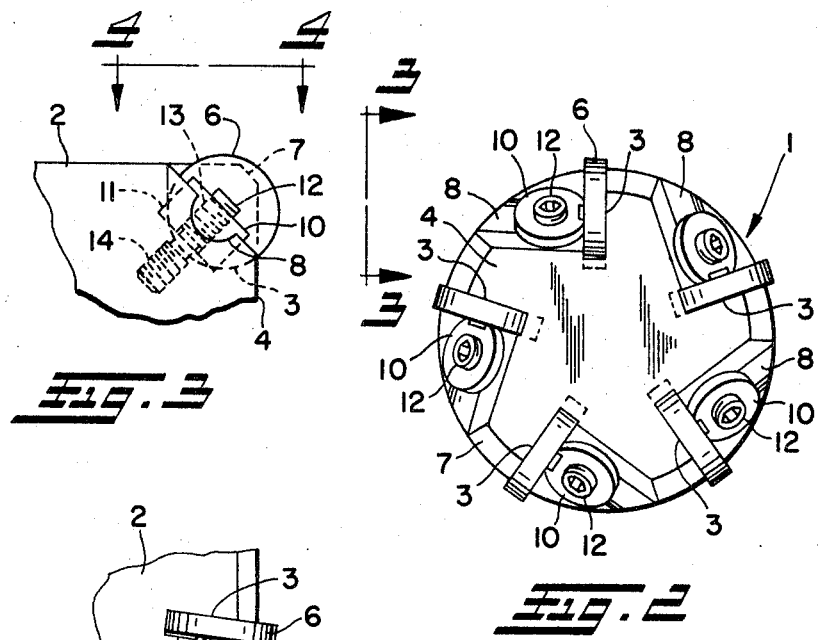
Fig. 3
Fig. 2
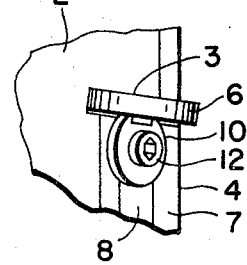
Fig. 4
INVENTOR.
FRANK A. SPRIGGS
BY
Oberlin, Maky, Donnelly & Renner
ATTORNEYS

ROTARY CUTTING TOOL

BACKGROUND OF THE INVENTION

This invention relates generally as indicated to rotary cutting tools, and more particularly, to certain improvements in rotary cutting tools of the type utilizing removable blade inserts.

Rotary cutting tools with removable blade inserts have the advantage that as the cutting edges wear out the blade inserts may be replaced without having to remove the cutting tools from the spindle of a milling machine or the like and regrind all of the cutting edges as is ordinarily required for conventional cutters. Thus, not only do cutting tools with removable blade inserts eliminate the time and expense of regrinding the cutting tools; there is also no additional set-up time required to get the machine back in operation again. Better cutting materials such as tungsten carbide may also be used for the blade inserts instead of high speed cutting tool steels for longer blade life, and after a portion of the blade inserts has become dull or worn, the blade inserts may be rotated to present a new cutting edge without having to replace or regrind the blade inserts.

One of the major drawbacks of cutting tools with blade inserts was that the seats for the blade inserts usually required the use of adaptors and the like which made the cutting tools more complex and expensive to manufacture, and if the blade inserts were not adequately supported by the seats, early fracture of the blade inserts and inferior cutting would result. Adjustment and replacement of the blade inserts were also sometimes made difficult because of the manner in which the blade inserts were secured in their respective seats, and the seats did not always assure preset dimensions for the blades when adjusted or replaced.

SUMMARY OF THE INVENTION

With the foregoing in mind, it is a principal object of this invention to provide a cutting tool which securely holds circular blade inserts in a permanent set and yet readily permits adjustment of the blade inserts to expose a new cutting edge or replacement of the blade inserts as required.

Another object of the invention is to provide such a cutting tool with arcuate seats for the blade inserts formed directly in the body of the cutting tool to reduce costs and permit adjustment and replacement of the blade inserts without affecting the cutting diameter of the tool.

Still another object is to provide a novel method of machining the seats for the blade inserts in the cutter body.

These and other objects of the present invention may be obtained by milling arcuate slots in the end face of the cutter tool body using a keyway cutter which provide the desired arcuate seats for receipt of circular blade inserts. Before milling the slots, sufficient clearance must be provided to permit the keyway cutter to cut into the cutting tool body to the desired extent without interference by drilling clearance holes sideways into the cutter body adjacent the end face and removing the excess material at an angle partway through the clearance holes so that the arbor of the keyway cutter is free to enter the clearance holes during the milling operation. In this manner, the curvature of the slots may be made to conform to the curvature of the circular blade inserts while allowing the slots to be cut to a sufficient depth to provide adequate support for the blade inserts, the clearance holes permitting the milling cutter to cut into the cutting tool body at an angle to a depth greater than the radius of the keyway cutter. Wedge clamps or the like may be used to hold the blade inserts within the slots, and when loosened permit turning of the blade inserts within the slots to present a new cutting surface or replacement of the blade inserts while maintaining a preset dimension for the blade inserts as determined by the depth of the slots.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In the annexed drawing:

FIG. 1 is a fragmentary isometric view of a preferred form of cutting tool with blade inserts constructed in accordance with this invention;

FIG. 2 is an end elevation view of the cutting tool of FIG. 1 as seen from the left end thereof;

FIG. 3 is a fragmentary side elevation view of the cutting tool as seen from the plane of the line 3—3 of FIG. 2 showing the manner in which one of the blade inserts is retained in an arcuate seat in the cutting tool body; and FIG. 4 is a fragmentary top plan view of the blade insert and cutter body of FIG. 3 as seen from the plane of the line 4—4 thereof.

DESCRIPTION OF THE PREFERRED EMBODIMENT

Referring now in detail to the drawing and first especially to FIG. 1, there is shown a preferred form of rotary cutting tool 1 in accordance with this invention including a body 2 of noncutting material having a plurality of circumferentially spaced arcuate slots 3 in the end face 4 thereof providing seats for a corresponding number of circular blade inserts 6. The cutting tool illustrated has five such arcuate slots 3 with blade inserts 6 therein, but it will be apparent that the number provided may be varied as desired. However, it has been found that an odd number of cutting blades will reduce vibrations. One or more of these cutting tools 1 may be mounted in conventional manner in the spindle of a milling machine for milling one or more workpieces as desired.

The blade inserts 6 themselves are circular with flat parallel spaced apart side walls and are made out of a suitable material, such as tungsten carbide which is an excellent cutting material but is brittle and may fracture if not properly supported within the cutting tool body 2. To avoid this problem, the slots 3 in the cutting tool body 2 which receive the circular blade inserts 6 are formed with an arcuate contour substantially corresponding to the curvature of the blade inserts and are of approximately the same width as the blade inserts and have flat parallel sides for close mating engagement thereby. Moreover, the axial center of each arcuate slot 3 is desirably located both radially and axially inwardly of the outer edge 7 of the body end face 4 so that the slots are sufficiently deep to provide adequate support for both the sides and outer periphery of the blade inserts. In the preferred form shown, the slots 3 extend substantially 180° in the tool body and are of a depth almost as great as the diameter of the blade inserts, exposing only a small portion of the blade inserts projecting outwardly beyond the outer periphery and end face of the tool body.

The slots 3 are desirably formed in the cutting tool body 2 by a milling operation using a keyway cutter. Before the slots 3 can be milled to the desired depth described above, however, adequate clearance must be provided for the arbor of the milling cutter so that the milling cutter is free to cut into the body beyond its axial center. Accordingly, preparatory to the milling operation clearance holes 8 are drilled sideways in the cutting tool body 2 adjacent the end face 4 thereof at an angle corresponding approximately to the desired axial center of the arcuate slots 3, after which the edge 7 of the end face 4 is milled at an angle part way through the clearance holes 8 to permit the arbor of the keyway cutter to enter the clearance holes during the milling operation. During milling, the slots 3 are desirably cut at a slight angle to the longitudinal axis of the cutting tool body 2 as shown in FIG. 4 to provide the desired rake and relief for the blade inserts 6 when mounted within the slots.

To hold the blade inserts 6 firmly in position within the respective slots 3, wedge clamps 10 are desirably inserted in blind holes 11 intersecting the relieved sides of the slots 3 at an angle to permit wedging engagement of the wedge clamps with one side of the blade inserts upon tightening of a differential pitch screw 12 or other suitable fastener threadedly engaging an opening 13 in the wedge clamps and a tapped opening 14 in the bottom of each blind hole.

As apparent, such a seating and clamping arrangement for the circular blade inserts 6 provides excellent support for the blade inserts and holds them in a permanent set to minimize the chance of fracture while permitting the blade inserts to perform their cutting function without the use of expensive adaptors and the like. The provision of arcuate seats 3 for the circular blade inserts 6 also has the advantage that as the blade inserts become dull or worn, they may readily be rotated to present a new cutting edge or replaced with a new blade insert without affecting the cutting diameter of the tool since the arcuate seats maintain a preset dimension for the blade inserts. To rotate or remove the blade inserts 6 merely requires the loosening of the wedge clamps 10 by loosening the screws 12, after which the screws need only be retightened and the cutting tool is ready for operation once again without affecting the other blade inserts or other cutting tools which may be mounted in the same machine. In contrast, if one or more of the cutting edges of a conventional high speed cutting tool requires sharpening, all of the cutting tools must be removed from the machine and all of the cutting edges reground within certain tolerances if their overall lengths are to remain the same. Such regrinding operations are both expensive and time consuming, and afterwards additional time must be spent to set the machine up for operation again.

The embodiments of the invention in which an exclusive property or privilege is claimed are defined as follows:

1. A rotary cutting tool comprising a tool body having an end face at one end, a plurality of circumferentially spaced arcuate slots formed directly in said tool body adjacent said end face, said arcuate slots having flat parallel spaced apart side walls, circular blade inserts received in said slots, the curvature of said slots substantially corresponding to the curvature of said circular blade inserts to provide seats for direct mating engagement by said circular blade inserts, said circular blade inserts having flat parallel sides and being of substantially the same width as said slots for supporting both sides of said inserts by the side walls of said slots, and means for retaining said circular blade inserts within said slots.

2. The tool of claim 1 wherein both side walls of said slots extend to a depth greater than half the diameter of said circular blade inserts for supporting more than one half of both sides of said circular blade inserts within said slots.

3. The tool of claim 2 wherein said slots extend approximately 180° within said tool body for increased support of said circular blade inserts.

4. The tool of claim 1 wherein the depth of said slots is such that only a small portion of said circular blade inserts projects outwardly beyond the outer periphery and front face of said tool body.

5. The tool of claim 1 wherein said slots are disposed at an angle to the longitudinal axis of said tool body to provide the desired rake and relief for said circular blade inserts.

6. The tool of claim 1 wherein there are an odd number of said slots with said circular blade inserts therein uniformly spaced around the periphery of said tool body to reduce vibrations of said tool during use.

7. The tool of claim 1 wherein said means for retaining said circular blade inserts within said slots comprises wedge clamps fastened to said tool body engaging one side of said circular blade inserts adjacent one side wall of said slots, said one side wall being relieved to expose less than one half of said one side of said inserts for engagement of said one side by said wedge clamps.

8. The tool of claim 7 further comprising semi-annular passages extending sideways along the face of the relieved portions of said one side wall from the outer periphery of said tool body in line with the axial center of said slots.

* * * * *